United States Patent
Krishnamoorthi et al.

(10) Patent No.: US 9,042,461 B2
(45) Date of Patent: May 26, 2015

(54) EFFICIENT EMPLOYMENT OF DIGITAL UPSAMPLING USING IFFT IN OFDM SYSTEMS FOR SIMPLER ANALOG FILTERING

(75) Inventors: Raghuraman Krishnamoorthi, San Diego, CA (US); Fuyun Ling, San Diego, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1583 days.

(21) Appl. No.: 11/373,001

(22) Filed: Mar. 9, 2006

(65) Prior Publication Data

US 2006/0215540 A1    Sep. 28, 2006

Related U.S. Application Data

(60) Provisional application No. 60/660,887, filed on Mar. 10, 2005.

(51) Int. Cl.
*H04N 7/18* (2006.01)
*H04L 27/26* (2006.01)

(52) U.S. Cl.
CPC .................. *H04L 27/2644* (2013.01)

(58) Field of Classification Search
CPC .. H04N 7/50; H04N 7/26244; H04N 7/26271
USPC .................................. 375/200–260
See application file for complete search history.

(56) References Cited

U.S. PATENT DOCUMENTS

| | | | |
|---|---|---|---|
| 5,488,632 A * | 1/1996 | Mason et al. | 375/260 |
| 6,430,227 B1 * | 8/2002 | Kroeger et al. | 375/260 |
| 6,449,244 B1 | 9/2002 | Loseke | |
| 7,072,411 B1 * | 7/2006 | Dollard | 375/260 |
| 7,113,559 B2 * | 9/2006 | Baas et al. | 375/350 |
| 7,502,408 B2 * | 3/2009 | Kim et al. | 375/219 |
| 2002/0105901 A1 | 8/2002 | Chini et al. | |
| 2003/0189894 A1 | 10/2003 | Nee et al. | |

FOREIGN PATENT DOCUMENTS

ER    0 869 646 A2    10/1998
JP      7226724 A2     8/1995

(Continued)

OTHER PUBLICATIONS

International Search Report, PCT/US2006/008949, International Searching Authority, European Patent Office, Jul. 17, 2006.

(Continued)

*Primary Examiner* — Andy Rao
(74) *Attorney, Agent, or Firm* — Norton Rose Fulbright US LLP

(57) ABSTRACT

Systems and methods are provided for transmitting OFDM information via IFFT up-sampling components that transmit data at a higher sampling rate than conventional systems to simplify filter requirements and mitigate leakage between symbols. In one embodiment, an NL point IFFT is performed on a zero inserted set of frequency domain symbols. In another embodiment, the NL point IFFT is further optimized by exploiting the fact that (N−1) L of the frequency domain symbols are zero. This enables an embodiment that consists of a pre-processor that multiplies the input samples by complex phase factors, followed by L point IFFTs.

28 Claims, 10 Drawing Sheets

(56) References Cited

FOREIGN PATENT DOCUMENTS

| | | |
|---|---|---|
| JP | 8331101 A2 | 12/1996 |
| JP | 11215096 A | 8/1999 |
| JP | 11252037 A | 9/1999 |
| JP | 2000123000 A | 4/2000 |
| JP | 2001007880 A | 1/2001 |
| JP | 2001186104 A2 | 7/2001 |
| TW | 546630 B | 8/2003 |
| WO | WO0044144 | 7/2000 |

OTHER PUBLICATIONS

Written Opinion, PCT/US2006/008949, International Searching Authority, European Patent Office, Jul. 17, 2006.

International Preliminary Report on Patentability, PCT/US2006/008949, The International Bureau of WIPO, Geneva, Switzerland, Sep. 12, 2007.

Oung, K. B.; Darnell, M.; Boussakta, S.: "Embedded channel estimation for OFDM: types of sources and performance" Proceedings of third international symposium on communication systems networks and digital signal processing, Jul. 15, 2002.

"Agilent Option UND Generating Digital Modulation with Agilent ESG-D Series Dual Arbitrary Waveform Generator". Mar. 6, 2002, Agilent Technologies, USA.

Duhamel, P. et al: "Fast Fourier Transforms: A Tutorial Review and a State of the Art" Signal Processing, Elsevier Science Publishers B.V. Amsterdam, NL, vol. 19, No. 4, Apr. 1, 1990.

Office Action in Japan application 2008-501034 corresponding to U.S. Appl. No. 11/373,001, citing DUHAMEL_FAST_FOURIER_pgs_259_299_year_1990, JP11215096, JP2001186104A2, JP7226724A2, JP8331101A2, JP11252037A, JP2001007880A and JP2000123000A dated Apr. 15, 2011.

Taiwan Search Report—TW095108325—TIPO—Sep. 10, 2012.

\* cited by examiner

EFFICIENT EMPLOYMENT OF DIGITAL UPSAMPLING USING IFFT IN OFDM SYSTEMS FOR SIMPLER ANALOG FILTERING

CROSS REFERENCE TO RELATED APPLICATION

This application claims the benefit of U.S. Provisional Patent Application Ser. No. 60/660,887 filed on Mar. 10, 2005, entitled "Digital upsampling using IFFT" the entirety of which is incorporated herein by reference.

BACKGROUND

I. Field

The subject technology relates generally to communications systems and more particularly to systems and methods that transmit OFDM information by performing sub-carrier transform operations for transmitters over a higher bandwidth of transmitted samples.

II. Background

Orthogonal frequency-division multiplexing (OFDM) is a method of digital modulation in which a signal is split into several narrowband channels at different frequencies. The technology was first conceived during research into minimizing interference among channels near each other in frequency. In some respects, OFDM is similar to conventional frequency-division multiplexing (FDM). The difference lies in the way in which the signals are modulated and demodulated. Generally, priority is given to minimizing the interference, or crosstalk, among the channels and symbols comprising the data stream. Less importance is placed on perfecting individual channels.

In one area, OFDM has also been used in European digital audio broadcast services. The technology lends itself to digital television, and is being considered as a method of obtaining high-speed digital data transmission over conventional telephone lines. It is also used in wireless local area networks. Orthogonal Frequency Division Multiplexing can be considered an FDM modulation technique for transmitting large amounts of digital data over a radio wave where OFDM operates by splitting a radio signal into multiple smaller sub-signals or sub-carriers that are then transmitted simultaneously at different frequencies to the receiver. One advantage of OFDM technology is that it reduces the amount of crosstalk in signal transmissions where current specifications such as 802.11a WLAN, 802.16 and WiMAX technologies employ various OFDM aspects.

Traditional OFDM transmitters generally consist of an Inverse Fast Fourier Transform (IFFT) component followed by cyclic prefix addition. This operation is performed at the Nyquist rate at the transmitter which leads to very tight filtering requirements after digital to analog conversion (DAC) in order to remove images separated at the sampling frequency. Such filtering can be achieved in the analog or digital domain but the requirements for tight filtering cause several problems. One obvious problem is the cost associated with implementing a tight or steep filter. For instance, a first order filter would provide plus or minus 20 db per decade of filter roll-off near the corner frequency of the filter. Steeper or tighter 2nd or third order filters would provide 40 db or 60 db per decade roll-off respectively and are typically more complex to implement thus increasing filter cost. Implementing filtering in the digital domain leads to long filter lengths, increasing complexity. Also, filtering in the analog or digital domains reduces the resiliency of the transmitted OFDM signal to channel distortions.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for transmitting Orthogonal frequency-division multiplexing (OFDM) information via digital up-sampling that employs an Inverse Fast Fourier Transform (IFFT) at the transmitter output which generates samples at a higher sampling rate compared to conventional systems to mitigate transmitter filter requirements. In one embodiment, the IFFT processes OFDM sub-carriers or symbols to generate samples at one or more multiples above the Nyquist sampling rate at the transmitter output which mitigates strident filter requirements and potential leakage between sub-carriers. One implementation includes cascaded Fast Fourier Transforms (IFFTs) which are adapted to perform an IFFT function for the transmitter output. Since the output sample rate is a multiple of the Nyquist rate, a subset of the inputs to the IFFT is generally always zero. For instance, to generate samples at twice the Nyquist rate, half of the input symbols to the IFFT are zero. The cascade then performs IFFTs over twice (or more multiples) of the desired Nyquist bandwidth which markedly reduces filtering requirements at the transmitter. Thus, an efficient process can be provided for implementing up-sampling in an OFDM system that performs the IFFT over a higher bandwidth of samples in order that the samples generated out of the IFFT are already at a multiple of the Nyquist rate. This is contrasted from traditional up-sampling of a digital signal. In this embodiment, there is no memory across OFDM symbols. The embodiment of the IFFT over the higher bandwidth can be further simplified by exploiting the fact that a subset (e.g., half) of the sub-carriers are zeroed. It is noted that the systems and methods described herein are not restricted to wireless systems and are applicable to all OFDM/DMT systems.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for transmitting OFDM information via IFFT up-sampling components that transmit data over a higher band width than conventional systems to simply filter requirements and mitigate leakage between symbols. In one embodiment, a method is provided for transmitting OFDM symbols. The method includes zero padding the sub-carriers prior to performing an IFFT to generate samples at N times the Nyquist rate, where N is an integer greater than or equal to 2. This is helpful in mitigating filter requirements and inter symbol interference (ISI).

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
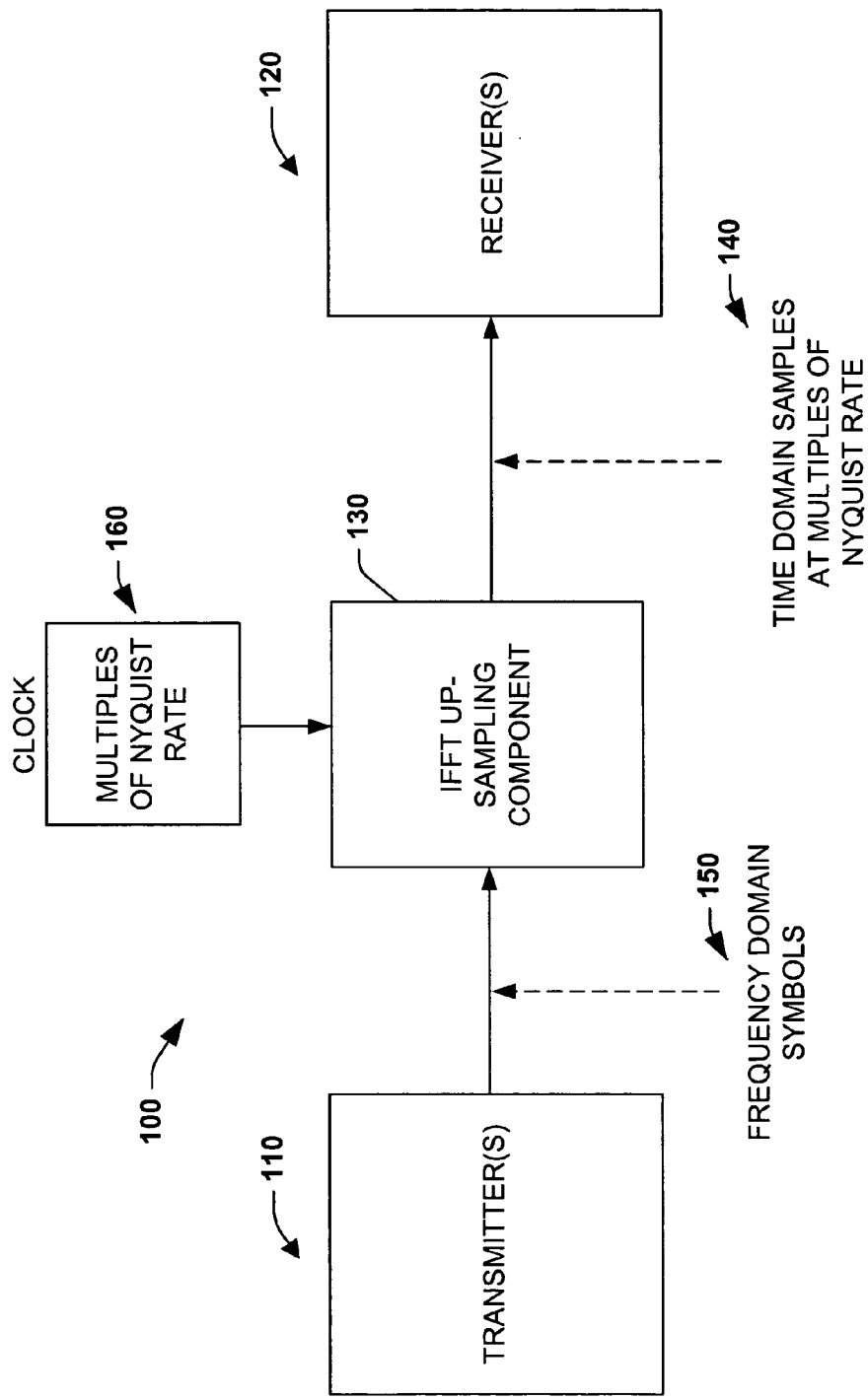
FIG. 1 is a schematic block diagram illustrating an up-sampling IFFT generator for a wireless network.

FIG. 1 illustrates an up-sampling IFFT generator for a wireless network and system 100. The system 100 includes one or more transmitters 110 that communicate across a wireless network to one or more receivers 120. The receivers 120 can include substantially any type of communicating device such as a cell phone, computer, personal assistant, hand held or laptop devices, and so forth. An Inverse Fast Fourier Transform (IFFT) up-sampling component 130 is provided to transmit an OFDM time domain sample set 140 at multiples of the Nyquist rate namely at N multiples above conventional Nyquist sampling rates. This is achieved by applying a frequency domain set of symbols at 150 to the IFFT component 130, where input to the IFFT can include adding a subset of zeros at 140. As illustrated, a clock 160 is provided and operates at N multiples of the Nyquist sampling rate. For instance, if 4096 symbols at 150 were to be transmitted over a given timeframe, the clock would be increased such that 8192 samples were transmitted over the same period at 140. By transmitting data at a higher sampling rate, filter requirements can be simplified. This also facilitates inter symbol interference since reduced filter requirements mitigate leakage between symbols. It is noted that the higher bandwidth sampling concepts described herein can be applied to wired and/or wireless communications systems. The system 100 supports a process for transmitting Orthogonal Frequency-Division Multiplexing (OFDM) broadcast information. This includes determining a subset of carriers at 150 to broadcast in an OFDM wireless network and performing a transform at N sample multiples over the subset of carriers at 130 to mitigate filter requirements or noise generation in the wireless network, where N is an integer greater than or equal to 2. This includes processing at least one subset of carriers as desired information and at least one other subset of carriers as zeros at 140.

In one embodiment, an IFFT performs up-sampling, where a subset of zeros are inserted at 130 to extend the number of frequency domain symbols 150. Further optimization of the IFFT structure that performs up-sampling can be achieved by noting that a significant portion of the frequency domain signals are zero. By exploiting this aspect, a first stage of an NL point IFFT (described below) can be simplified such that the final implementation only requires N, L-point IFFTs with some pre-processing. As will be described in more detail below, a pre-processor receives L input symbols and multiplies them by complex twiddle factors to generate the inputs to the L-point IFFTs. In another embodiment, the system 100 is employed for transmitting OFDM information in a network. The system includes means for transmitting a symbol stream (110); means for transforming the symbol stream according to at least two multiples of a Nyquist sampling rate (130); and means for receiving the symbol stream in the network (120).

Figure 2:
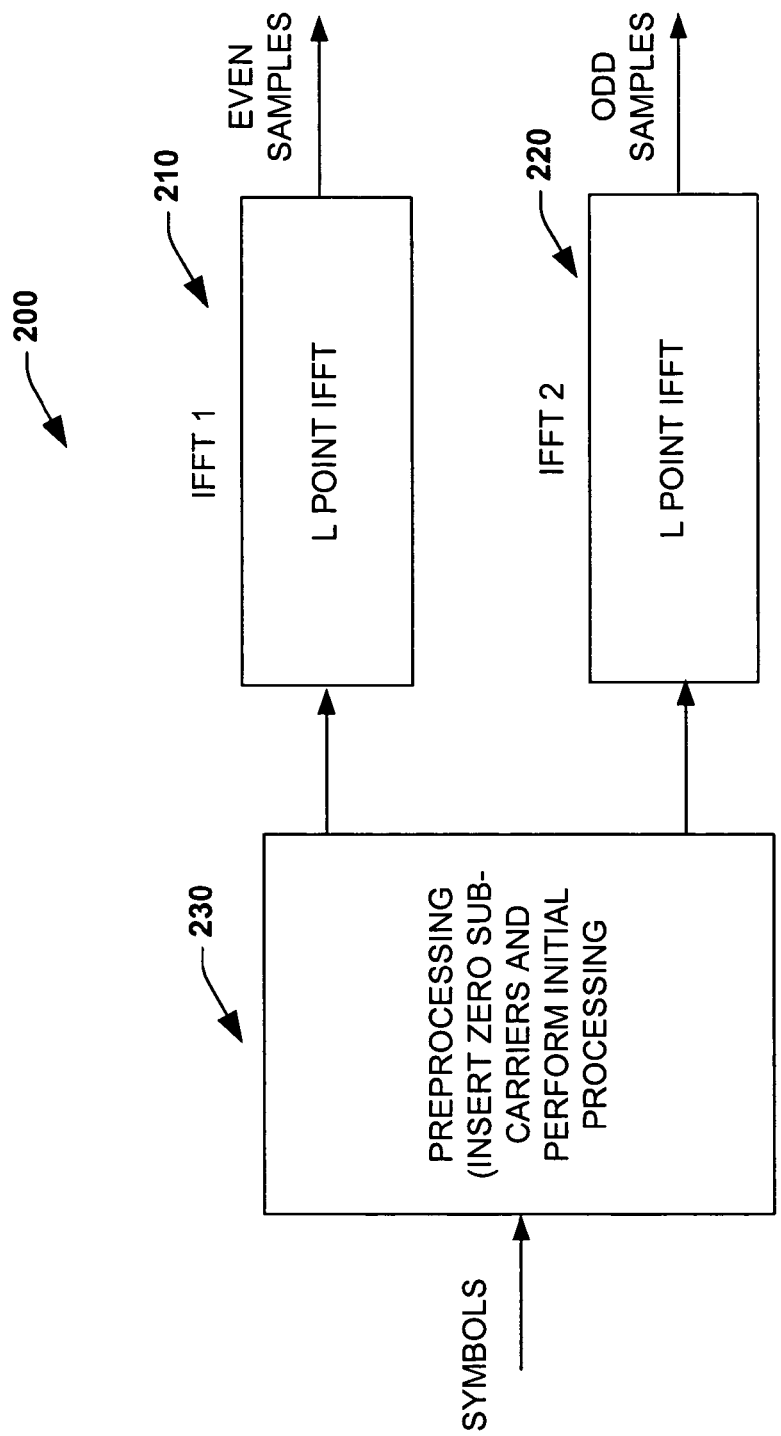
FIG. 2 an example system for performing high bandwidth up-sampling.

FIG. 2 illustrates an example system 200 for performing high bandwidth up-sampling. In this example, two Fast Fourier Transform (FFT) blocks (e.g., 4096) are shown at 210 and 220, where the respective FFT blocks are adapted to perform Inverse FFTs or IFFTs. It is noted that the system 200 is merely shown as an illustrative example and that more generalized systems can be employed having different block configurations than the example. As illustrated, the block at 210 represents an IFFT subset block that generates even samples of a wireless transmitter output. If x(n) is the final transmitted sequence, block 210 produces the sequence x(2n). At 220, a second block performs IFFTs to generate the sequence x(2n+1) As shown, a pre-processing block 230 is employed to process a plurality of frequency domain symbols (e.g., 4096) in this example, insert zero sub-carriers as will be described below, perform initial processing, and generate appropriate inputs to the IFFT blocks 210 and 220. It is noted that the subject technology described herein employs IFFT up-sampling that is at least 2 sample multiples over a conventional up-sampled system.

Figure 3:
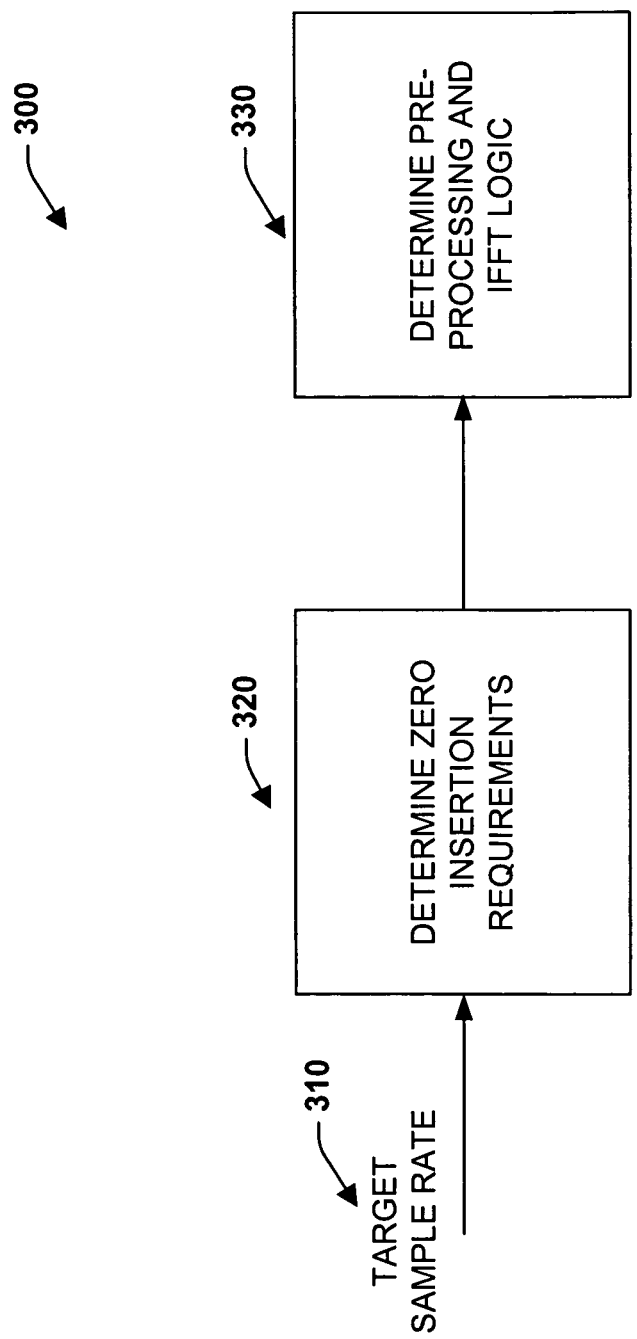
FIG. 3 illustrates an example architecture for configuring a cascaded stage Inverse Fast Fourier Transform (IFFT) block.
Figure 4:
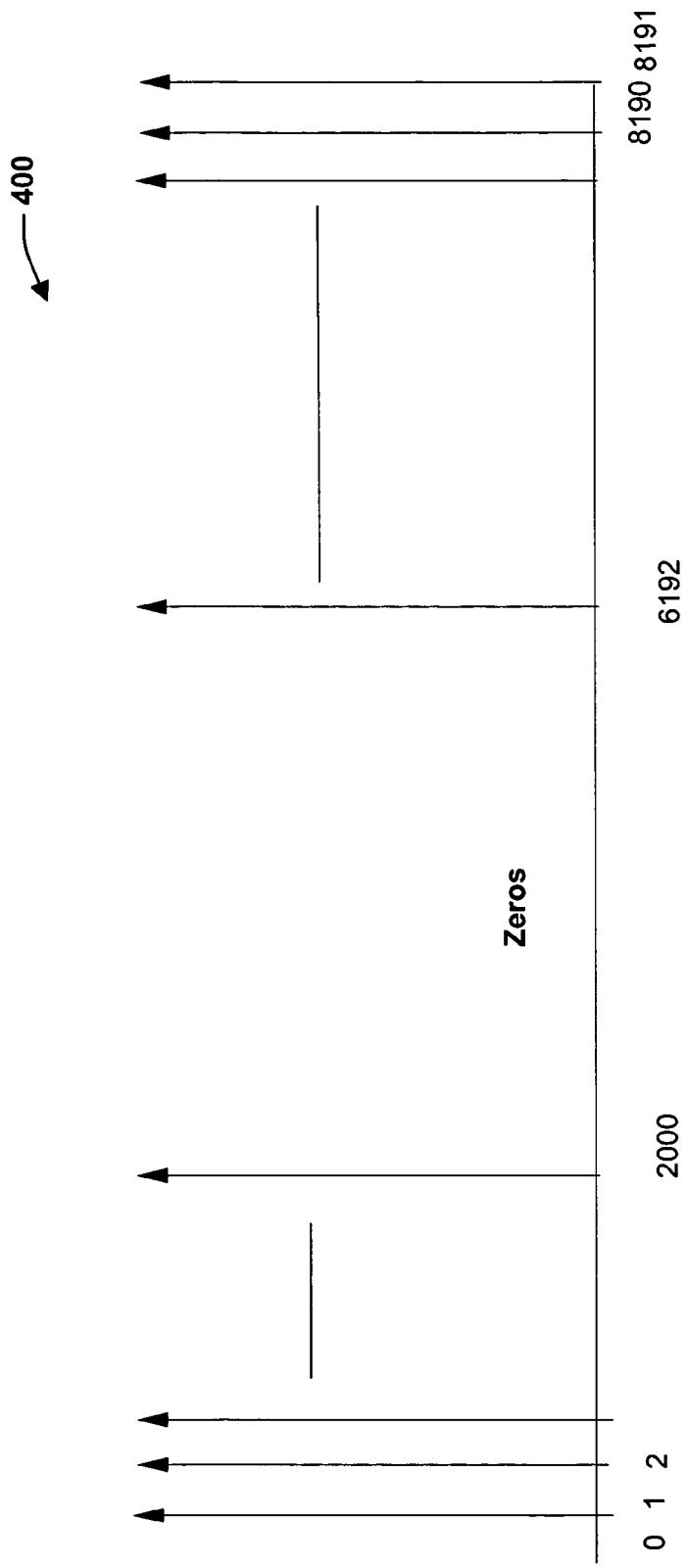
FIG. 4 illustrates an example automatic frequency control block that employs a frequency value determined from a one-shot frequency estimator block.

FIG. 3 illustrates an example architecture 300 for configuring a cascaded stage Inverse Fast Fourier Transform (IFFT) block. At 310, a target sample rate is selected. In order to generate samples at N times the Nyquist rate, L frequency domain symbols are extended to NL frequency domain symbols by zero insertion at 320. In one specific example, For N=2 and L=4096, this zero insertion range is shown in FIG. 4. Referring back to FIG. 3, after determining zero insertion requirements at 320, preprocessing and IFFT logic is determined as will be described on more detail below with respect to FIG. 5. The extended frequency domain symbols are processed using a NL point IFFT which can be decomposed into L, N-point IFFTs followed by twiddle multiplication and N, L-point IFFTs. This leads to a simpler design of the analog filters following the digital to analog converter (DAC) at the output of the transmitter.

Figure 5:
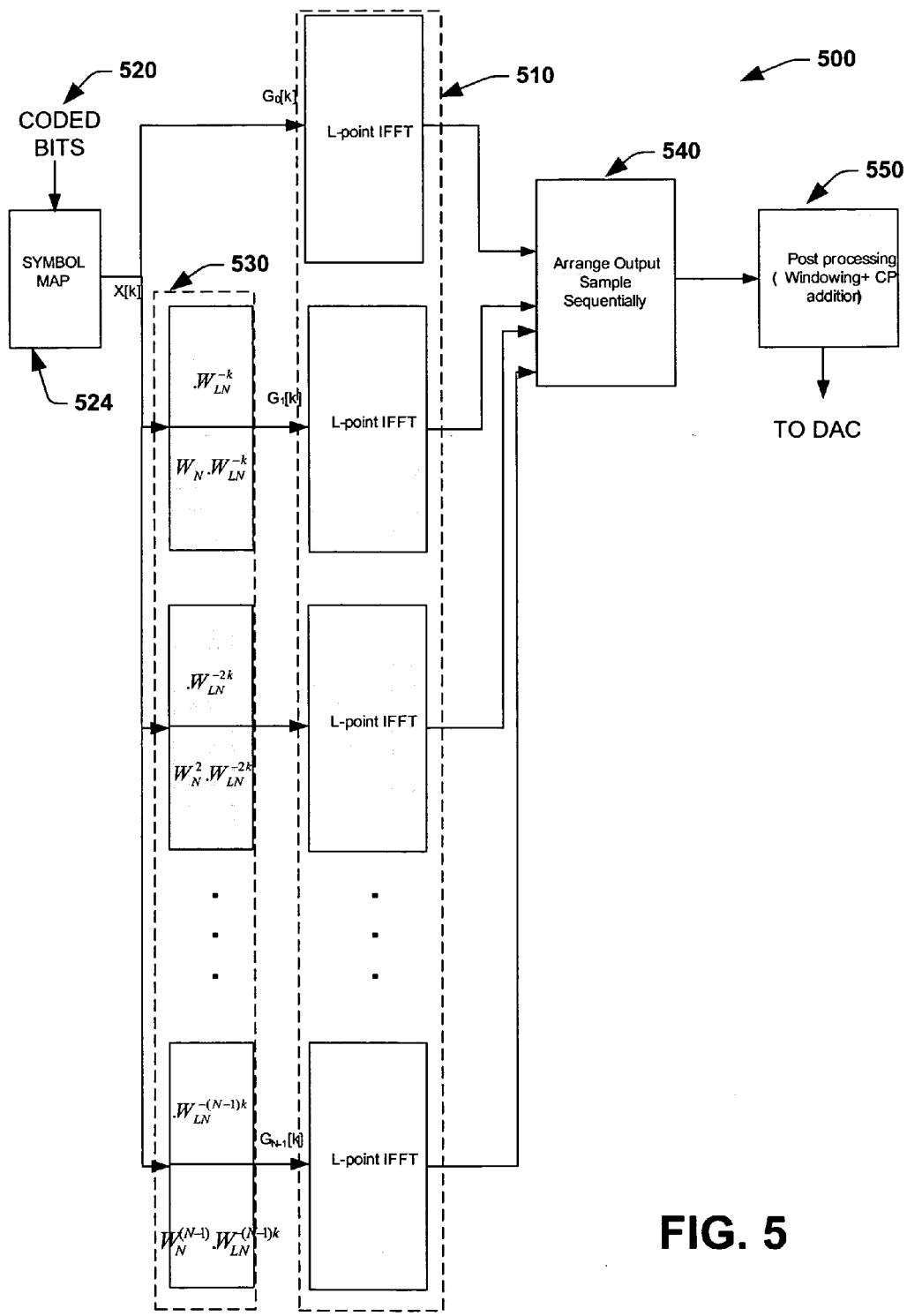
FIG. 5 illustrates an example system that performs higher bandwidth transmitter sampling.

FIG. 5 illustrates an example system 500 that performs higher bandwidth transmitter sampling. For an OFDM system with L sub-carriers, a block of N, L point IFFTs are employed as shown at 510 to convert coded bits 520 to respective time domain samples, where the coded bits 520 represent frequency domain symbols and are stored in a symbol map 524. In order to perform an up-sampling by N using IFFTs, an NL point IFFT is performed. From the basic theory of IFFTs, an NL point IFFT can be decomposed into L, N-point IFFTs followed by a twiddle multiplication via multiplier blocks at 530 and N, L-point IFFTs at 510. Also, since only L frequency domain symbols/OFDM symbol are being transmitted, generally only L of the NL inputs to the NL point IFFT are non-zero. Therefore, the first L, N-point IFFTs can be optimized. The outputs of the L, N-point IFFTs can be computed easily as the input multiplied by an additional twiddle factor as derived below. This is an additional saving in complexity, on top of the savings in filtering complexity due to using the IFFT to produce samples at a higher rate. It is noted that the outputs of the N L-point IFFTs following the first stage produce the samples x(nN), x(nN+1), x(nN+2) up to x(nN+(N−1)) respectively. These outputs are then arranged sequentially at 540 to produce the output samples in the correct order.

After samples are arranged sequentially, pre-processing 550 such as windowing and cyclic prefix addition is performed before the time domain samples are supplied to a digital to analog converter (DAC) for transmission. As illustrated, coded bits are supplied to the symbol map at 524 which produces an output X[k]. Output X[k] drives multiplier blocks 530 to produce G[k] that drives the block of N, L-Point IFFT blocks at 510. Output from the IFFT blocks 510 is sent to a component that performs sequential arrangement of data at 540 and provides output to a post processor 550 at an increased multiple of the Nyquist rate.

In general, if the inputs to the NL point IFFT are referred as Z(k) and the L symbols to be sent as X(k), Z(k) is related to X(k) as follows:

$$Z(k)=X(k) \quad 0<=k<L/2$$

$$Z(k)=X(k-(N-1)\cdot L) \quad LN-L/2<=k<LN$$

$$Z(k)=0 \text{ otherwise}$$

Mathematically, time domain samples x(n) can be related to the sub-carrier inputs as:

$$x(n) = \sum_{k=0}^{LN-1} Z(k) W_{LN}^{-kn}, \quad n = 0 \ldots LN-1, \quad W_N = e^{-j\frac{2\pi}{N}}$$

$$x(Nn+q) = \sum_{k=0}^{L-1}\sum_{p=0}^{N-1} Z(k+pL) W_{LN}^{-(k+pL)(Nn+q)}$$

$$x(Nn+q) = \sum_{k=0}^{L-1}\sum_{p=0}^{N-1} Z(k+pL) W_N^{-pq} \cdot W_{LN}^{-pq} \cdot W_L^{-kn}$$

$$x(Nn+q) = \sum_{k=0}^{L-1} W_L^{-kn}\left(\sum_{p=0}^{N-1} Z(k+pL) W_N^{-pq}\right) W_{LN}^{-kq}$$

$$x(Nn+q) = \sum_{k=0}^{L-1} W_L^{-kn} G_q[k]$$

It is noted that because most of the sub-carriers are zero, the equation for $G_q[k]$ simplifies to:

$$G_q[k] = \left(\sum_{p=0}^{N-1} Z(k+pL) W_N^{-pq}\right) W_{LN}^{-kq} \quad \text{Equation 1}$$

-continued $$= Z(k) \cdot W_{LN}^{-kq} \quad 0 \leq k < L/2$$

$$= Z(k + (N-1)L) \cdot W_N^{-(N-1)q} \cdot W_{LN}^{-kq} \quad L/2 \leq k < L$$

$$= X(k) \cdot W_{LN}^{-kq} \quad 0 \leq k < L/2$$

$$= X(k) \cdot W_N^{-(N-1)q} \cdot W_{LN}^{-kq} \quad L/2 \leq k < L$$

As an example, consider L=4096, N=2 Therefore, $$G_0[k] = X(k) \quad 0 \leq k < L$$

$$G_1[k] = X(k) \cdot W_{2L}^{-k} \quad 0 \leq k < L/2$$

$$= X(k) \cdot W_2^{-1} W_{2L}^{-k} \quad L/2 \leq k < L$$

$$= -X(k) \cdot W_{2L}^{-k} \quad L/2 \leq k < L$$

Figure 6:
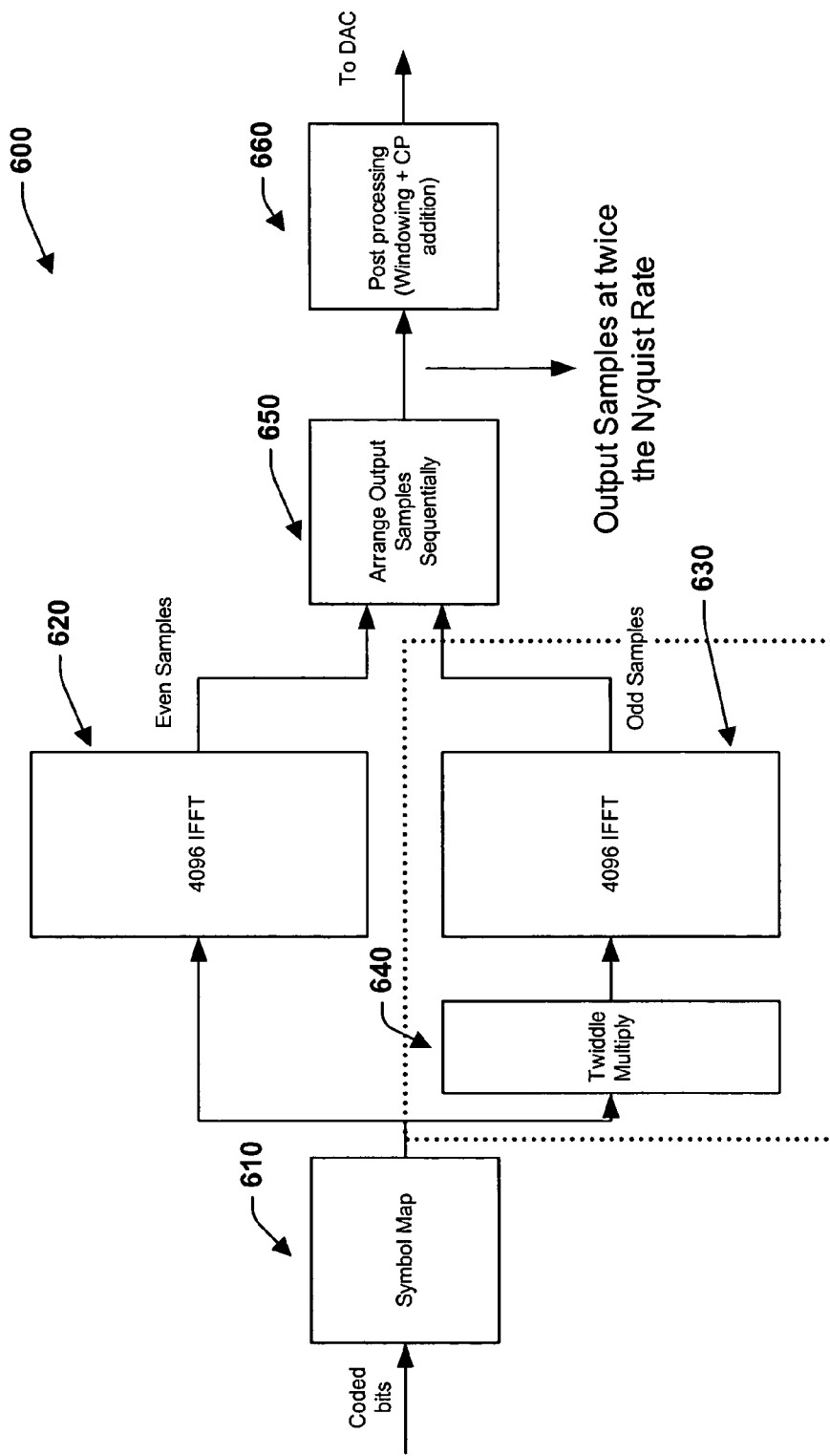
FIG. 6 illustrates an alternative example system that performs higher bandwidth transmitter sampling.

FIG. 6 illustrates a specific example system 600 that performs higher bandwidth transmitter sampling, where L=4096 and N=2. Coded bits are supplied to a symbol map 610 which fills an even sample IFFT block 620 and an odd sample IFFT block 630 which is also driven by a multiply function at 640. Output from the IFFT blocks 620 and 630 is sent to a component that performs sequential arrangement of data at 650 and provides output to a post processor 660 at twice the Nyquist rate. The post processor 660 can provide aspects such as sample windowing and cyclic prefix addition before driving a digital to analog converter (DAC).

In general, up-sampling can be performed using an IFFT that leads to an implementation with lower complexity, both in terms of easier analog filtering and easier digital filtering. It is noted that performing up-sampling using an IFFT does not employ memory across OFDM symbols. Therefore, this embodiment does not reduce the margin of the OFDM/DMT system to channel delay spread. The IFFT can be further simplified by decomposing it into L N-point IFFTs followed by N L-point IFFTs as noted above with respect to FIG. 5.

Figure 7:
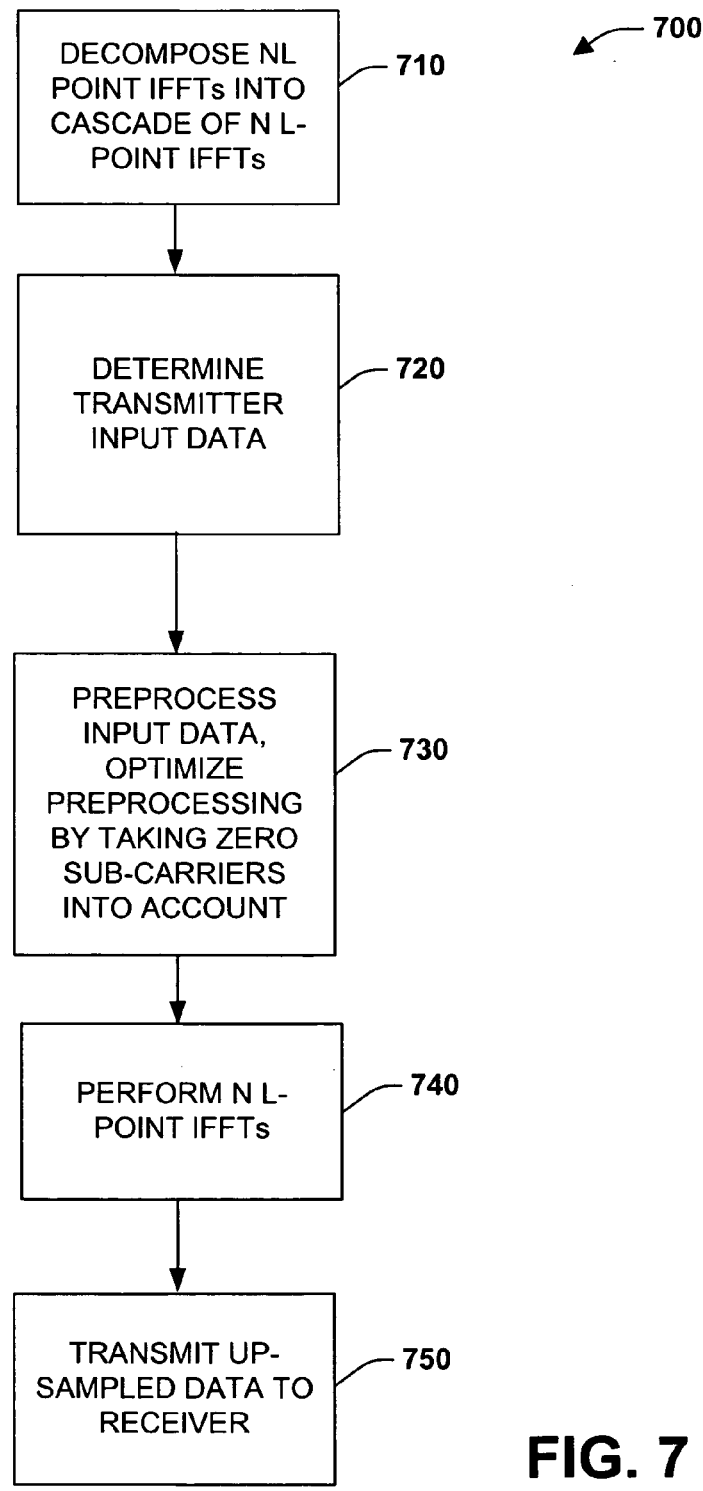
FIG. 7 illustrates an example process that performs higher bandwidth transmitter sampling.

FIG. 7 illustrates an example IFFT transmission processes for wireless systems. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

FIG. 7 illustrates an example IFFT transmission process 700. Proceeding to 710, decompose NL point IFFTs into cascade of N L-point IFFTs and L N-Point IFFTs . . . . At 720, transmitter input data is determined. Such data can include voice or computer communications data to be transmitted across a wireless network. At 730, pre-process input data and optimize pre-processing by taking zero sub-carriers into account. At 740, perform N L-Point IFFTs. At 750, up-sampled data is transmitted at an increased sample rate to one or more receivers.

Figure 8:
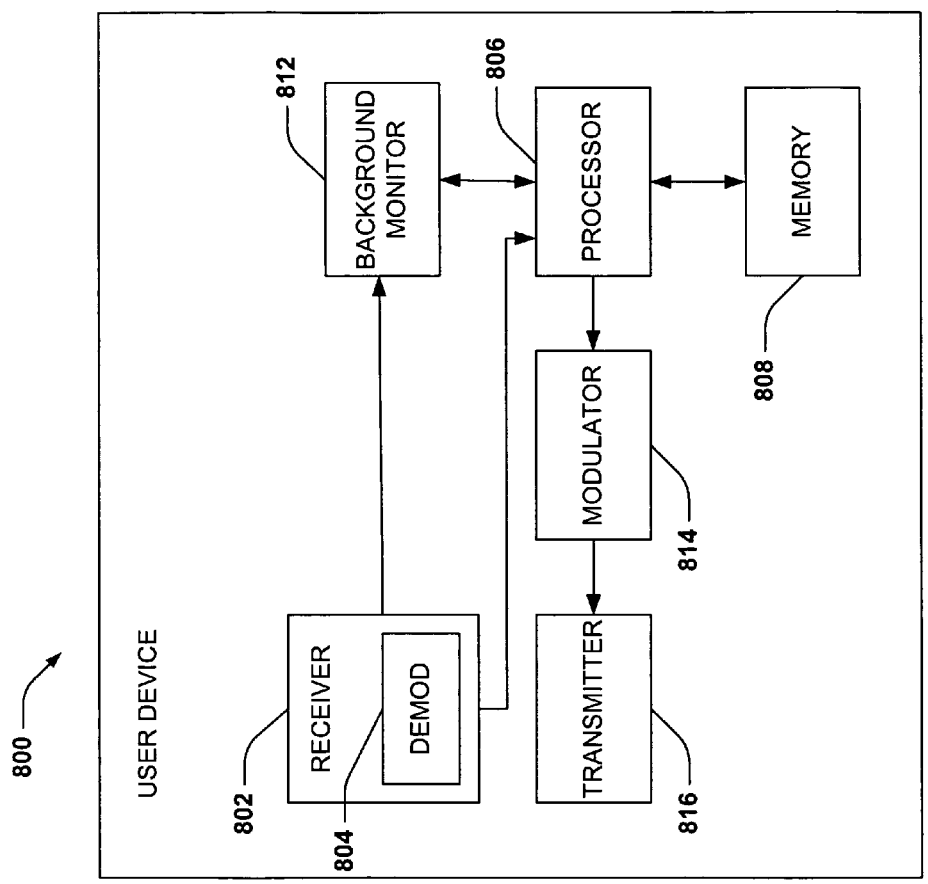
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a non-linear receiver. A demodulator 804 can demodulate and provide received pilot symbols to a processor 806 for channel estimation. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800. User device 800 can additionally comprise memory 808 that is operatively coupled to processor 806.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing data, a symbol modulator 814 and a transmitter 816 that transmits the modulated signal.

Figure 9:
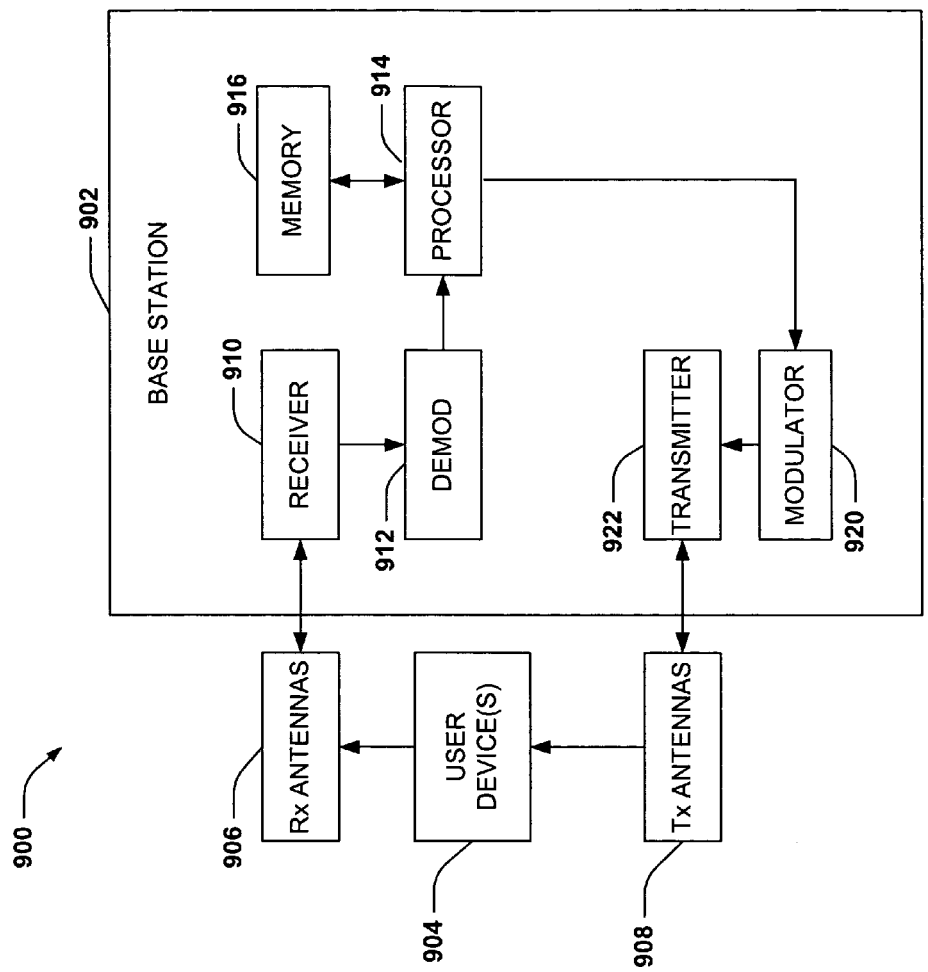
FIG. 9 is a diagram illustrating an example base station for a wireless system.

FIG. 9 illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 and which is coupled to a memory 916 that stores information related to user ranks, lookup tables related thereto, and/or any other suitable information related to performing the various actions and functions set forth herein. A modulator 922 can multiplex a signal for transmission by a transmitter 924 through transmit antenna 908 to user devices 904.

Figure 10:
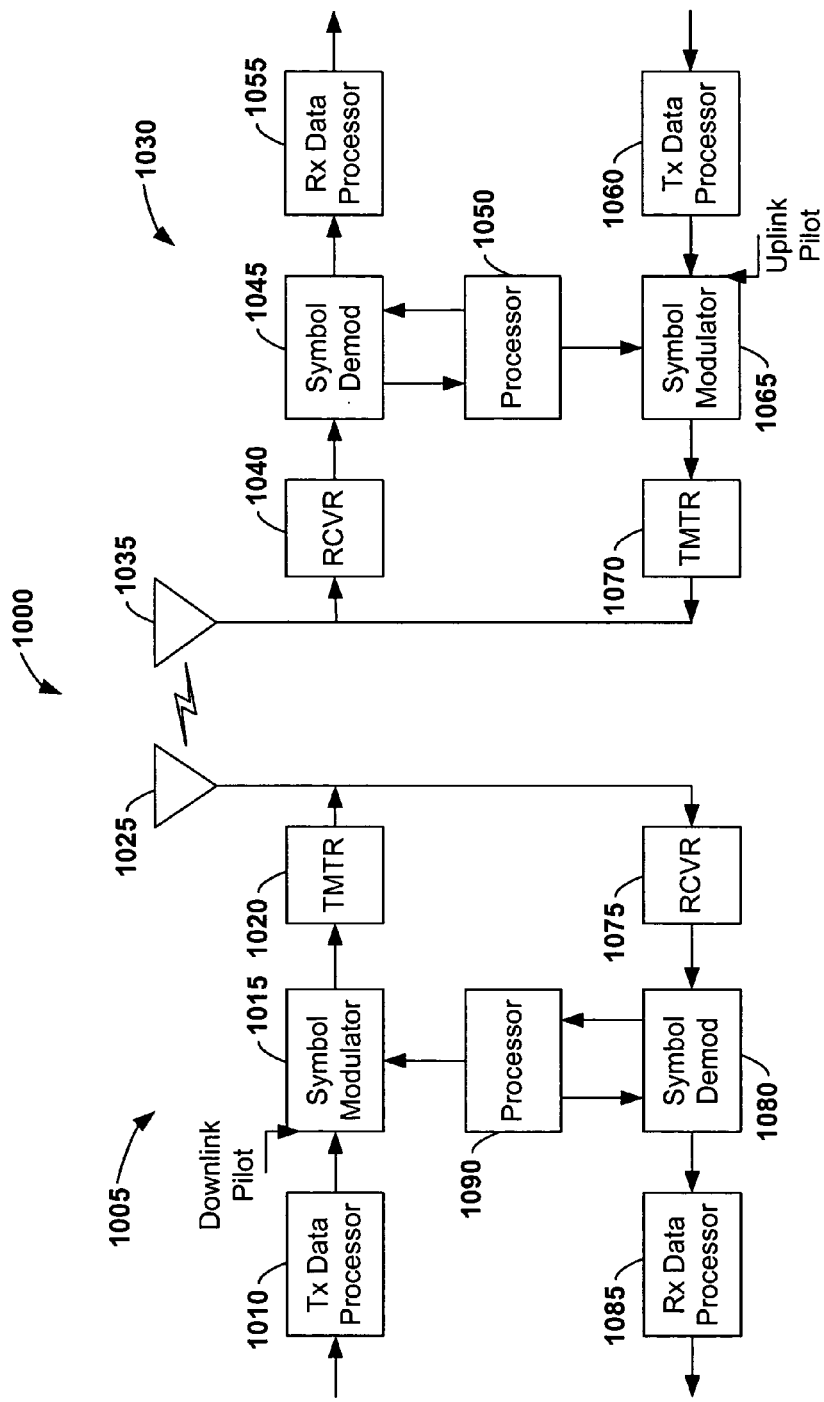
FIG. 10 is a diagram illustrating an example transceiver for a wireless system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for transmitting OFDM information, comprising: determining a set of sub-carriers to broadcast in an OFDM network; applying zero padding to the set of sub-carriers by inserting zeros within the set of sub-carriers at a zero insertion range determined according to a zero insertion requirement to generate an extended set of sub-carriers; and then performing an Inverse Fast Fourier Transform (IFFT) of the extended set of sub-carriers to generate samples at N multiples above the Nyquist rate to mitigate filter requirements or noise generation in the network, where N is an integer greater than or equal to 2, wherein the zero insertion requirement comprises determining the zero insertion range such that the IFFT of the extended set of sub-carriers generates the samples at N multiples above the Nyquist rate.

2. The method of claim 1, further comprising processing at least one subset of carriers from the extended set of sub-carriers as desired information and at least one other subset of carriers from the extended set of sub-carriers as zeros.

3. The method of claim 2, further comprising processing the zeros during even or odd samples at a transmitter performing the transform.

4. The method of claim 1, wherein the IFFT is performed as a cascade of Fast Fourier Transforms (FFTs).

5. The method of claim 4, further comprising at least two cascades to perform up-sampling.

6. The method of claim 5, the cascades are employed to mitigate filtering requirements at an OFDM transmitter.

7. The method of claim 5, the cascades are employed to mitigate leakage between OFDM symbols or sub-carriers.

8. The method of claim 1, further comprising decomposing an 8192 point IFFT into two 4096 IFFTs.

9. The method of claim 8, further comprising determining at least two additional IFFT stages.

10. The method of claim 9, further comprising employing at least one memory block to process the IFFT operations.

11. A transmitter module for a wireless network system, comprising: a processor to generate a carrier subset for a transmitter; a clock adapted to operate at N multiples above a Nyquist rate for the transmitter; a pre-processor to apply zero padding to the carrier subset by inserting zeros within the carrier subset at a zero insertion range determined according to a zero insertion requirement to generate an extended carrier subset; and a transform component to perform an Inverse Fast Fourier Transform (IFFT) of the extended carrier subset to generate samples at N multiples above the Nyquist rate in order to mitigate filter requirements for the transmitter, where N is an integer greater than or equal to 2, and wherein the zero insertion requirement comprises determining the zero insertion range such that the IFFT of the extended carrier subset generates the samples at N multiples above the Nyquist rate.

12. The module of claim 11, further comprising at least two Inverse Fast Fourier Transform (IFFT) components to generate samples at a higher sampling rate.

13. The module of claim 12, the IFFT components are adapted from Fast Fourier Transform (FFT) components.

14. The module of claim 12, the IFFT components generate one or more even and odd samples.

15. The module of claim 14 wherein the pre-processor performs zero padding to a frequency domain symbol set within the carrier subset to generate the extended carrier subset.

16. The module of claim 15, further comprising at least one memory to operate an FFT block adapted to perform an IFFT.

17. A system for transmitting OFDM information in a network, comprising: means for transmitting a symbol stream; means for applying zero padding to a first frequency domain symbol set comprising a number of frequency domain symbols within the symbol stream, wherein the zero padding is applied at a zero insertion range and is determined according to a zero insertion requirement, wherein the zero padding produces a second frequency domain symbol set comprising at least twice the number of frequency domain symbols of the first frequency domain symbol set; means for performing an IFFT transform of the second frequency domain symbol set to generate samples at N multiples above a Nyquist sampling rate; and means for receiving the generated samples in the network, where N is an integer greater than or equal to 2, wherein the zero insertion requirement comprises determining the zero insertion range such that the IFFT transform of the second frequency domain symbol set generates the samples at N multiples above the Nyquist rate.

18. A computer readable storage medium having computer executable instructions stored thereon for causing a computer to perform operations, comprising: determining a carrier subset for a transmitter; applying zero padding to a first frequency domain symbol set comprising a number of frequency domain symbols within the carrier subset, wherein the zero padding is applied at a zero insertion range and is determined according to a zero insertion requirement, wherein the zero padding produces a second frequency domain symbol set comprising at least twice the number of frequency domain symbols; and applying the second frequency domain symbol set to an IFFT to generate samples for transmission in a network, wherein the samples are generated at N multiples above the Nyquist rate to mitigate filter requirements or noise generation in a network, wherein the zero insertion requirement comprises determining the zero insertion range such that the IFFT transform of the second frequency domain symbol set generates the samples at N multiples above the Nyquist rate.

19. The computer readable storage medium of claim 18, further comprising performing an N multiple IFFT on the second frequency domain symbol set.

20. The computer readable storage medium of claim 19, further comprising decomposing the IFFT into a cascade of FFTs.

21. The computer readable storage medium of claim 20, further comprising segregating the cascade for even and odd IFFT samples.

22. The computer readable storage medium of claim 21, further comprising performing an NL point IFFT that is decomposed into L, N-point IFFTs.

23. The computer readable storage medium of claim 22, further comprising performing a multiplication and N, L-point IFFTs.

24. The computer readable storage medium of claim 23, further comprising decomposing the IFFTs into L N-point IFFTs followed by N L-point IFFTs.

25. A computer readable storage medium having stored thereon instructions for causing a computer to:
perform an IFFT on a stored transmitter symbol set to generate samples at N multiples above the Nyquist rate to mitigate filter requirements or noise generation in a network, where the IFFT is divided into at least two data processing fields; and employ at least one of the data processing fields to apply zero padding to the stored transmitter symbol set, wherein the zero padding is applied at a zero insertion range and is determined according to a zero insertion requirement, to produce at least twice the number of symbols of the stored transmitter symbol set, where N is an integer greater than or equal to 2, wherein the zero insertion requirement comprises determining the zero insertion range such that the IFFT generates the samples at N multiples above the Nyquist rate.

26. The computer readable storage medium of claim 25, further comprising segregating the two data processing fields for even and odd processing fields.

27. A wireless communications transmitter, comprising: a memory that stores an IFFT to perform an up-sampling operation to generate samples at N multiples above the Nyquist rate; and a processor to apply zero padding to a first frequency domain symbol set, wherein the zero padding is applied at a zero insertion range and is determined according to a zero insertion requirement, wherein the zero padding produces a second frequency domain symbol set comprising at least twice the number of frequency domain symbols of the first frequency domain symbol set, wherein the second frequency domain symbol set is submitted to the up-sampling operation, where N is an integer greater than or equal to 2, wherein the zero insertion requirement comprises determining the zero insertion range such that the IFFT generates the samples at N multiples above the Nyquist rate.

28. A wireless communications network, comprising:
a base station adapted to generate an extended symbol set applying zero padding to a first symbol set, wherein the zero padding is applied at a zero insertion range and is determined according to a zero insertion requirement, and then to perform Inverse Fast Fourier Transforms (IFFT) of the extended symbol set to generate samples at an increased sample multiple, where the sample multiple is at least two times over a Nyquist sampling criterion; and at least one wireless receiver to receive the first symbol set across the wireless communications network, wherein the zero insertion requirement comprises determining the zero insertion range such that the IFFT of the extended symbol set generates the samples at N multiples above a Nyquist rate.

* * * * *